Sept. 8, 1931.   J. OSSANNA ET AL   1,822,369
CASCADE CONNECTION FOR COMMUTATOR MACHINES
Filed June 20, 1928    2 Sheets-Sheet 2
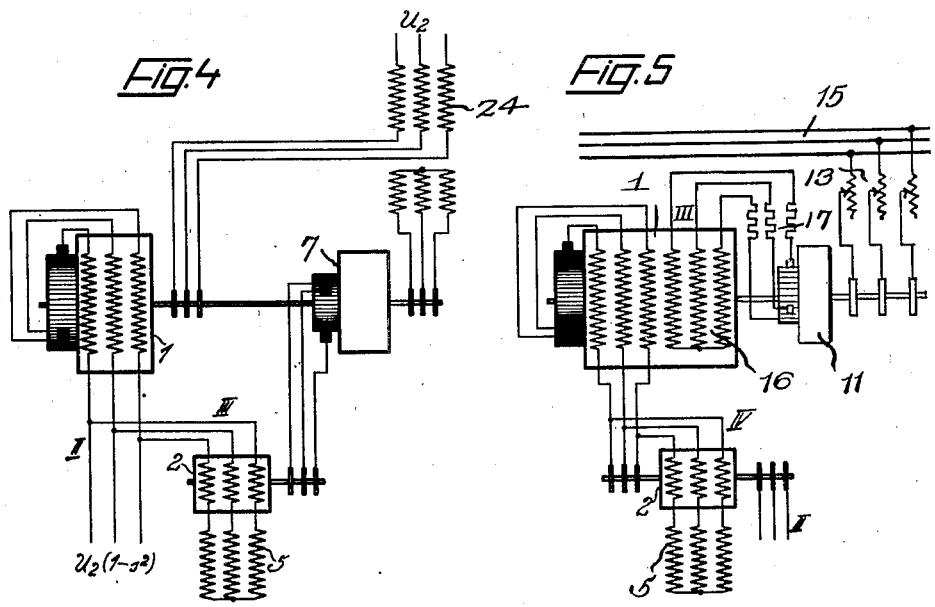
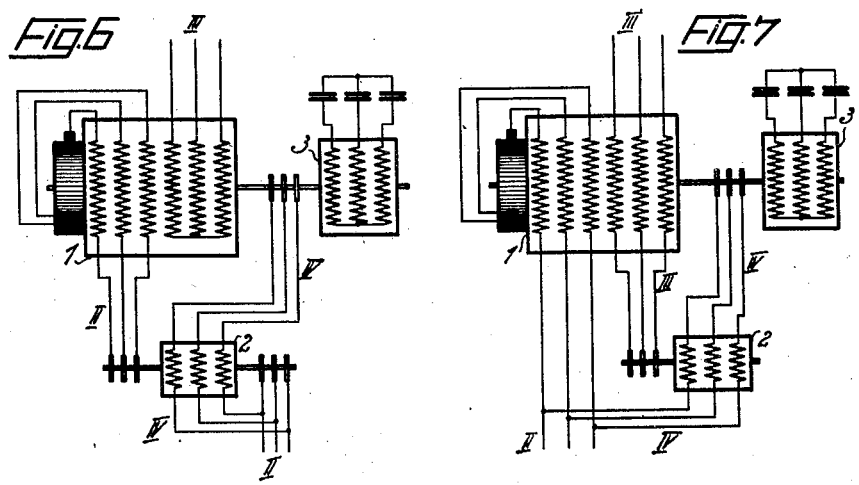

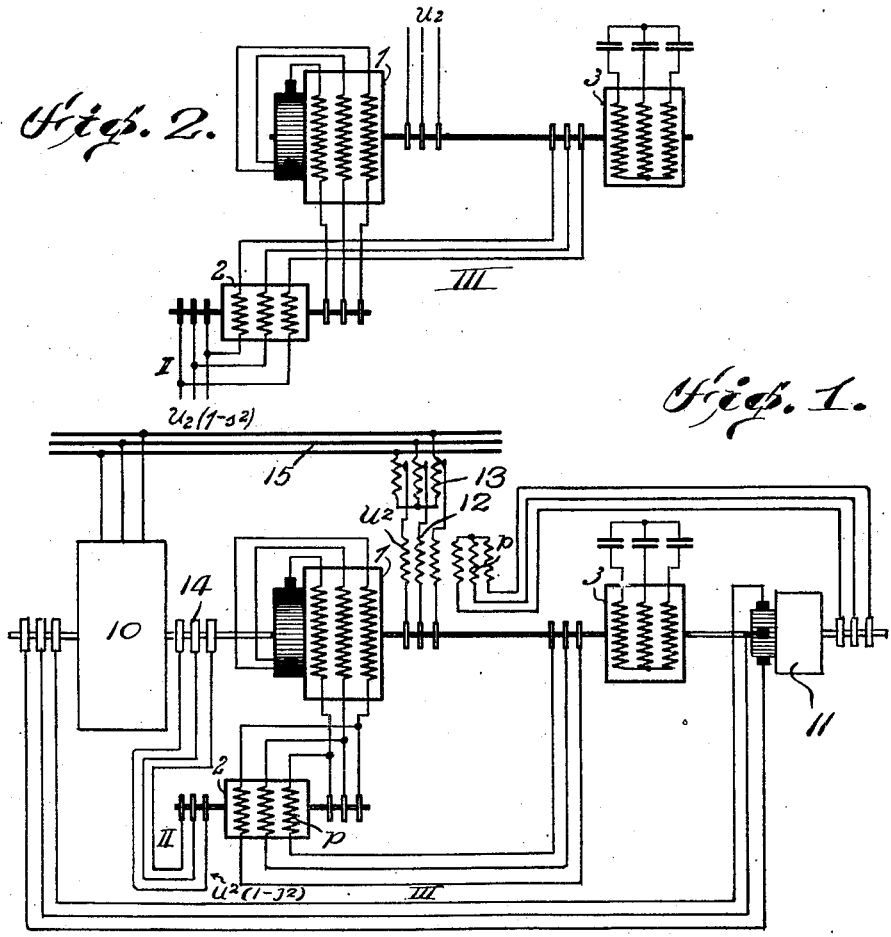
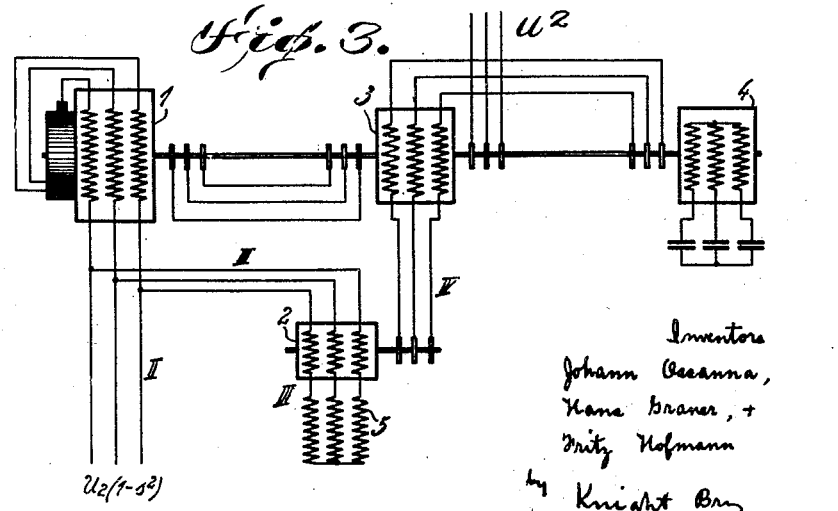

Patented Sept. 8, 1931

1,822,369

UNITED STATES PATENT OFFICE

JOHANN OSSANNA AND HANS GRANER, OF MUNICH, AND FRITZ HOFMANN, OF MUNICH-TALKIRCHEN, GERMANY, ASSIGNORS TO SIEMENS-SCHUCKERTWERKE AKTIEN-GESELLSCHAFT, OF BERLIN-SIEMENSSTADT, GERMANY, A CORPORATION OF GERMANY

CASCADE CONNECTION FOR COMMUTATOR MACHINES

Application filed June 20, 1928, Serial No. 286,931, and in Germany June 23, 1927.

Our invention relates to improvements in arrangements of commutator machines connected in circuits traversed by currents of variable frequency, and more specifically to such commutator machines, which are connected in the secondary circuit of asynchronous machines for the purpose of speed regulation or phase compensation.

One object of our invention is to compensate in such commutator machines the influence of the change in speed of the commutator machine upon the voltage introduced by the commutator machine into the secondary circuit of the asynchronous machine, (terminal voltage of the commutator machine) when such a commutator machine is provided in its stator with a compensation winding and is mechanically coupled with the asynchronous main machine. In such cases the commutator machine can be excited with net frequency in the rotor by way of slip rings, or it can be excited in the stator at slip frequency. In both cases the terminal voltage of the commutator machine, owing to the mechanical coupling with the asynchronous main machine deviates from the desired value an amount which is proportional to the slip of the asynchronous main machine.

When regulating asynchronous machines by means of commutator machines a frequency converter is frequently employed, which has the task of introducing into the secondary circuit of the asynchronous machine to be regulated directly or indirectly a variable voltage independent of the slip of the main machine. Proportionality then exists between the primary and secondary voltage if the voltage variation caused by the load current is not taken into account. This proportionality is lost, however, if the frequency converter is compensated by a stator winding traversed by the rotor current. This voltage of the slip frequency then becomes proportional not only to the slip ring voltage, but also to the degree of synchronism $$\frac{n}{n_o}$$

of the machine. The machine then completely loses its property as a converter. It acts as a generator or as a motor of the slip frequency, which is excited by alternating current of network frequency through the slip rings. For this reason this machine will hereafter be described as a commutator machine with network frequency excitation. In the commutator machine with network frequency excitation the voltage of the machine (voltage of the slip frequency), measured at the outside terminals of the compensating winding, is proportional not only to the exciter voltage (slip ring voltage), but also to the degree of synchronism $$\frac{n_o}{n_o}$$

This dependence of the machine voltage from the degree of synchronism involves, however, certain drawbacks, which are better avoided.

In order to eliminate the disturbing influence of the degree of synchronism upon the voltage of the commutator machine with network frequency excitation, we employ a substantially reactionless coupling transformer, the primary winding of which is fed from the voltage of the commutator machine with network frequency excitation and the secondary winding of which is connected either directly to the network circuit or indirectly (for instance through a frequency converter) to the exciter circuit of this machine. It is then necessary to render the primary circuit of the said coupling transformer non-inductive in some way.

The drawings affixed hereto and forming part of our specification illustrate some embodiments of our invention, and represent in Fig. 1, the connections with reference to a commutator rear machine connected in the secondary circuit of an asynchronous machine, Figs. 2, 3 and 4 each show a certain portion of the total arrangement shown in Fig. 1, illustrating particular portions of the invention, Fig. 5 represents an arrangement in accordance with the invention in which the commutator rear machine, connected into the secondary circuit of an asynchronous machine, is excited in the stator with slip frequency. The same as in Figs. 2, 3 and 4, only the portions of the system essential to the present invention are illustrated.

Fig. 6 shows a modification of the arrangement according to Fig. 5, and

Fig. 7 shows a modification of the arrangement according to Fig. 5, the secondary voltage of the transformer 6 employed by us being introduced into the exciter circuit of the commutator rear machine.

The arrangement in Fig. 1 shows the cascade connection of an asynchronous machine 10 having coupled with it mechanically a commutator rear machine 1, the commutator machine being suitably excited such that the load current of the asynchronous machine 10 remains constant at varying slip. For this purpose two voltage components are introduced into the secondary circuit of the asynchronous machine by way of the commutator machine 1, of which voltages one increases proportional with the slip and compensates the secondary voltage of the asynchronous machine, whereas the second voltage is in its value independent of the slip and produces correspondingly a load current which is independent of the slip. The commutator rear machine has its stator excited by way of slip rings, whereby the exciter component which is independent of the slip is furnished by the adjustable transformer 13 connected with the net 15. For supplying the exciter component which is proportional to the slip, a transformer 12 is provided, whose secondary winding $s$ is connected in series with the transformer 13, and whose primary winding $p$ is supplied from an auxiliary winding in the secondary part of the asynchronous machine 10 by way of slip rings 14 and by way of a frequency converter 11 mechanically coupled with machine 10. Owing to the coupling of the commutator rear machine 1 with the asynchronous machine 10, the speed of machine 10 deviates from the constant speed, corresponding with the net frequency, an amount which is proportional to the slip of the asynchronous machine. Accordingly, the lines of force produced by the field of machine 1 cut the rotor winding at constant speed, whereas the lines produced by the compensating winding in the stator cut the rotor winding with a speed which increases proportional to the slip. Therefore, a voltage is induced in the compensating winding which increases proportional to the slip which voltage is substracted from the commutator voltage of machine 1, and thereby disturbs the correct terminal voltage of machine 1 (the voltage at the outside terminals of the compensation winding). In order to compensate this disturbing influence introduced by the commutator machine 1 into the secondary circuit of asynchronous machine 10, a rotary transformer 2 is provided. The primary winding $p$ of this transformer which is arranged in the stator and shown in Fig. 1 by zig-zag lines, is excited by the terminal voltage of machine 1. The secondary winding of this transformer 2 which is arranged in the rotor and not illustrated, is connected with the secondary circuit II of the asynchronous machine 10. The inductive resistance of the primary winding of transformer 2 is compensated by means of an asynchronous machine 3 which is connected with the primary circuit of transformer 2, and which is loaded with condensers. In accordance with such a connection, transformer 2 has an exciter current which is proportional to the terminal voltage of machine 1. Since now transformer 2 operates with slip frequency, a voltage is induced in its secondary winding, which is on one hand proportional to the terminal voltage of machine 1, and on the other hand proportional to the slip frequency. Therefore, when suitably chosen in value and phase relation (which can be accomplished by properly adjusting the rotary transformer), the above described deviation of the terminal voltage of machine 1 from its desired value can be compensated by the introduction of an additional voltage into the secondary circuit of the asynchronous machine.

In the following the effect of the coupling transformer 2 is mathematically more clearly defined. In the following equations $n$ represents the speed of the asynchronous machine 10, respectively of the commutator rear machine 1, $m_0$ represents the synchronous speed of machines 10 and 1 corresponding with the slip value O, $s$ represents the slip of the asynchronous machine 10 in per cent, $U_2$ represents the voltage induced in the armature of machine 1 which is equal to the voltage at the commutator brushes, and which is in the arrangements according to Figs. 1 to 4 besides equal to the exciter voltage at the slip rings of the commutator machine, $U_{32}$ represents the secondary voltage of the coupling transformer 2 in the arrangements according to Figs. 1 and 2, $U_{42}$ represents the secondary voltage of transformer 2 in the arrangements according to Figs. 5 and 6.

We have thus in the arrangement Fig. 1 the fundamental equation $$U_2 \frac{n}{n_0} = U_2(1-s)$$

as the voltage of the slip frequency, if $s$ is the slip. To this voltage is added the voltage $U_{32}$ of the coupling transformer 2, the primary winding of which is fed by the voltage $U_2(1-s)$. By suitably dimensioning the coupling transformer 2 and by corresponding choice of the angle between its two windings, it is possible to attain the voltage $$U_2 \frac{n}{n_o} + U_{34} = U_2(1 - s^2)$$

in the place of the desired voltage $U_2$. The desired purpose has thus been practically obtained, since in most cases $s^2$ is negligibly small in comparison with 1.

The purpose may be still more perfectly attained with a system of connections illustrated in Fig. 2. Here the coupling transformer 2 is not fed by the voltage of the slip frequency of the commutator machine 1, but by the voltage corrected by the coupling transformer 2.

The arrangement becomes substantially more economical, if the voltage of the commutator machine supplied with network frequency is corrected not directly but indirectly. This is accomplished by correcting the exciter voltage, which is a voltage due to the network frequency. It is thus necessary first to transform the voltage of the slip frequency originating from the coupling transformer into a voltage of the network frequency.

In the system of connections illustrated in Fig. 3 the voltage at the secondary winding of the coupling transformer 2 serves for the excitation of a practically non-reactive asynchronous machine 6. The exciter circuit of this machine must be practically non-inductive. In the system illustrated in Fig. 3 this is attained by means of the before mentioned machine 3 loaded by condensers. The primary circuit III of the coupling transformer 2 on the other hand is rendered practically non-inductive by inserting in it a non-inductive resistance 5. The secondary winding of the asynchronous machine 6 is connected to the exciter circuit of the commutator machine with network frequency excitation. This series connection of the rotor windings of the machines 1 and 6 is indicated in Fig. 3 by the connection between the slip rings. It will, however, be obvious, that this series connection may also be effected without the aid of slip rings, if the rotors of the two machines are mounted on the same shaft. In the actual construction the six slip rings between the machines 1 and 6 are therefore omitted.

If, as above, the exciter voltage of the commutator machine 1 is denoted with $U_2$, it can be proved, that the voltage of the machine 1 assumes the value $U_2(1 - s^2)$, provided the coupling transformer is correspondingly dimensioned.

Exactly the same results are obtained by means of the wiring illustrated in Fig. 4 of the drawings. In this embodiment of our invention the voltage at the secondary winding of the coupling transformer 2 is brought to the network frequency by a frequency converter 7 and introduced into the exciter circuit of the commutator machine 1 by the transformer 24. Here also care must be taken, that the effective resistance of the circuit III is large in comparison with the wattless resistance. In Fig. 4 this is attained by connecting a resistance 5 in circuit.

In many cases it is advantageous to couple the commutator rear machine, having slip frequency excitation in the stator, with the asynchronous main machine. In this case the voltage of the commutator machine is, however, not only proportional to its exciter current, but also to the degree of synchronism, i. e. it is also dependent upon the speed of the asynchronous main machine. This dependence of the machine voltage from the degree of synchronism is, however, as unfavorable for attaining the aim, as the compensated commutator machine having network frequency excitation. It is therefore important to render also the voltage of the compensated commutator machine, having slip frequency excitation, independent of its speed and thus of the degree of synchronism of the main machine.

Here also the end in view may be attained either directly or indirectly as before in a compensated machine having network frequency excitation.

A direct solution of the problem is shown in the wiring diagrams of Figs. 5 and 6. The arrangement shown in Fig. 5 is distinguished from that shown in Fig. 1 by an exciter winding 16 provided in the stator of the commutator machine 1. This exciter winding is supplied with current from a frequency converter 11, whose slip rings are connected to the supply mains 15 by way of an adjustable transformer 13. For compensating the influence of the self-induction voltage of exciter winding 16 upon the exciter current ohmic resistances 17 are provided in the circuit containing exciter winding 16. The terminal voltage of machine 1 is here again, as in Fig. 1, corrected by the coupling transformer 2. In Fig. 5 the primary winding of the coupling transformer 2 is fed from the voltage of the commutator machine, in Fig. 6 on the other hand from the corrected voltage. The necessary approximate noninductivity of the primary circuit of the coupling transformer is in Fig. 5 obtained by means of a non-inductive resistance 5 and in Fig. 6 by the condenser loaded machine 3. If $U_2$ is the machine voltage and $U_{42}$ the voltage at the secondary winding of the coupling transformer, the correcting voltage in the system shown in Fig. 5 is given by the equation $$(U_2 + U_{42}) \frac{n}{n_o} = U_2(1 - s^2)$$

and that in the system shown in Fig. 6 by the equation $$(U_2 + U_{42})\frac{n}{n_o} = U_2$$

Without the coupling transformer we would, on the other hand, get the voltage $$U_2 = \frac{n}{n_o} = U_2(1-s)$$

The aim is thus attained either fully or very nearly.

In the indirect solution of the problem the secondary winding of the coupling transformer is not connected in the rotor circuit, but in the exciter circuit of the respective compensated commutator machine having slip frequency excitation, in order to obtain proportionality between the machine voltage and the exciter voltage. In this way is attained a considerable reduction of the size of the coupling transformer and thus a cheapening of the regulator plant.

Such a system of connections is illustrated in Fig. 7 of the drawings. The coupling transformer 2 the primary circuit of which is fed from the voltage of the commutator machine 1, measured at the outside terminals of the compensating winding, and which machine is rendered non-inductive by a condenser loaded machine 3, works on to the exciter circuit of the commutator machine. It is then necessary for the sake of efficiency that the wattless resistance of the exciter circuit III be compensated in some manner.

In the diagrams of connections shown it was assumed, that the wattless resistance of the primary circuit of the coupling transformers employed has been made very small in comparison with the ohmic resistance by connecting in circuit either an ohmic resistance or a condenser loaded machine. It will be readily understood, however, that instead of the means specifically mentioned any other suitable means might be employed capable of keeping the wattless resistance of this circuit small in relation to the ohmic resistance.

In the systems discussed so far, it has been tacitly assumed that all the coupling transformers are designed as induction voltage regulators. This is, however, by no means vital for the efficiency of the system. Ordinary static transformers may equally well be employed, so long as they are designed as far as possible non-reactive and are provided with suitable windings. It is also possible to employ a combination of both kinds of transformers or two transformers of the same kind in place of a single coupling transformer. In particular the first named combination of both kinds of coupling transformers may be used with advantage, when the angle between the two windings deviates little from 0° or 180° when a single coupling transformer is employed.

In this case a static coupling transformer would be employed for producing that component, which stands at right angles to the primary current of the respective coupling transformer, and a voltage regulator is employed for producing that component of the voltage, which stands at right angles to the first component. Instead of using a voltage regulator in this combination, a static coupling transformer may also be used, the secondary winding of which is changed over when passing through synchronism. Instead of changing over the secondary windings as just mentioned, two secondary windings may be provided and one of them be switched in place of the other when passing through synchronism.

Various other changes and modifications may be made without departing from the spirit and the scope of the invention, and we desire, therefore, that only such limitations shall be placed thereon as are imposed by the prior art.

We claim as our invention:

1. In a circuit carrying currents of varying frequency the combination of a commutator machine, having its commutator terminals connected with said circuit carrying varying frequency, a machine coupled with said commutator machine and adapted to affect the speed of the latter so as to deviate from a normal, constant value by an amount proportional to the varying frequency of the commutator machine supply circuit, a compensating winding on the commutator machine, a transformer and connections between the primary circuit of said transformer and the circuit of varying frequency, adapted to supply said primary circuit with the voltage prevailing at the commutator machine terminals, means for introducing a voltage into said circuit of varying frequency, which is proportional to the secondary voltage of said transformer, the value and phase of said introduced voltage being selected so as to compensate the influence of the commutator machine speed variations, which are proportional to the varying frequency, upon the voltage introduced by the commutator machine into the circuit of varying frequency.

2. In a circuit carrying currents of varying frequency the combination of a commutator machine, having its commutator terminals connected with said circuit carrying varying frequency, a machine coupled with said commutator machine and adapted to affect the speed of the latter so as to deviate from a normal, constant value by an amount proportional to the varying frequency of the commutator machine supply circuit, a compensating winding on the commutator machine, a transformer and connections between the primary circuit of said transformer and the circuit of varying frequency, adapted to supply said primary circuit with the voltage prevailing at the commutator machine terminals, means for compensating the influence of frequency variations upon the current in the primary circuit of said transformer, and means for introducing a voltage into said circuit of varying frequency, which is proportional to the secondary voltage of said transformer, the value and phase of said introduced voltage being selected so as to compensate the influence of the commutator machine speed variations, which are proportional to the varying frequency, upon the voltage introduced by the commutator machine into the circuit of varying frequency.

3. In a circuit carrying currents of varying frequency the combination of a commutator machine, having its commutator terminals connected with said circuit carrying varying frequency, a machine coupled with said commutator machine and adapted to affect the speed of the latter so as to deviate from a normal, constant value by an amount proportional to the varying frequency of the commutator machine supply circuit, a transformer and connections between the primary circuit of said transformer and the circuit of varying frequency, adapted to supply said primary circuit with the voltage prevailing at the commutator machine terminals, means for compensating the influence of frequency variations upon the current in the primary circuit of said transformer, an exciter winding on said commutator machine and means for supplying said winding from the secondary winding of said transformer and for introducing by way of said commutator machine a voltage into said variable frequency circuit which is proportional to the secondary voltage of said transformer, the value and phase of said introduced voltage being selected so as to compensate the influence of the commutator machine speed variations, which are proportional to the varying frequency, upon the voltage introduced by the commutator machine into the circuit of varying frequency.

4. In a circuit carrying currents of varying frequency the combination of a commutator machine, having its commutator terminals connected with said circuit carrying varying frequency, a machine coupled with said commutator machine and adapted to affect the speed of the latter so as to deviate from a normal, constant value by an amount proportional to the varying frequency of the commutator machine supply circuit, an exciter winding on the stator of said commutator machine, a transformer and connections between the primary circuit of said transformer and the circuit of varying frequency, adapted to supply said primary circuit with the voltage prevailing at the commutator machine terminals, means for compensating the influence of frequency variations upon the current in the primary circuit of said transformer, connections between the secondary winding of said transformer and said stator exciter winding, adapted to introduce into the circuit of varying frequency, and by way of the commutator machine, a voltage proportional to the secondary voltage of said transformer, the value and phase of said introduced voltage being selected so as to compensate the influence of the commutator machine speed variations, which are proportional to the varying frequency, upon the voltage introduced by the commutator machine into the circuit of varying frequency.

5. In a cascade connection for asynchronous machines in combination an asynchronous machine, a commutator rear machine mechanically coupled with said asynchronous machine, a circuit connected with said asynchronous machine and carrying the slip frequency currents of the asynchronous machine, connections between the commutator side of said commutator rear machine and said slip frequency circuit, a compensating winding disposed in the stator of said commutator machine, a transformer having its primary winding connected with said slip frequency circuit and adapted to impress the terminal voltage of said commutator machine upon said primary winding, means for compensating the influence of frequency variations upon the current in the primary circuit of said transformer, means for introducing a voltage into the slip frequency carrying part of the commutator machine which is at least proportional if not equal to the voltage at the secondary winding of said transformer, the value and phase of said introduced voltage being selected so as to compensate the influence of the commutator machine speed variations, caused by its coupling with the asynchronous machine, upon the voltage introduced by the commutator machine into the circuit carrying the varying slip frequency.

6. In a cascade connection for asynchronous machines in combination an asynchronous machine, a commutator rear machine mechanically coupled with said asynchronous machine and having its commutator side connected with the secondary circuit of said asynchronous machine, a compensating winding and an exciter winding in the stator of said commutator machine, a transformer having its primary winding connected with the secondary circuit of said asynchronous machine to introduce the commutator machine voltage into said primary transformer winding, means for compensating the influence of frequency variations upon the current in said primary transformer winding, connections between the secondary winding of said transformer and said exciter winding, adapted to apply a voltage to the secondary circuit of the asynchronous machine, by way of said commutator machine, which is proportional to the secondary voltage of said transformer, the value and phase of said voltage being adjusted so that it compensates the influence of the commutator speed variations, caused by its coupling with said asynchronous machine, upon the voltage introduced by the commutator machine into the secondary circuit of the asynchronous machine.

In testimony whereof we affix our signatures.

JOHANN OSSANNA.
HANS GRANER.
FRITZ HOFMANN.